United States Patent
Kani

(10) Patent No.: US 10,358,533 B2
(45) Date of Patent: Jul. 23, 2019

(54) RESIN COMPOSITION PELLET

(71) Applicant: THE NIPPON SYNTHETIC CHEMICAL INDUSTRY CO., LTD., Osaka (JP)

(72) Inventor: Shouichi Kani, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/064,841

(22) PCT Filed: Dec. 22, 2016

(86) PCT No.: PCT/JP2016/088440
§ 371 (c)(1),
(2) Date: Jun. 21, 2018

(87) PCT Pub. No.: WO2017/111055
PCT Pub. Date: Jun. 29, 2017

(65) Prior Publication Data
US 2018/0371179 A1    Dec. 27, 2018

(30) Foreign Application Priority Data

Dec. 23, 2015  (JP) .................................. 2015-250784

(51) Int. Cl.
*C08J 3/12* (2006.01)
*B29B 9/06* (2006.01)

(52) U.S. Cl.
CPC ...................................... *C08J 3/12* (2013.01); *B29B 9/06* (2013.01); *C08J 2300/22* (2013.01); *C08J 2325/06* (2013.01); *C08J 2331/04* (2013.01); *C08J 2333/08* (2013.01); *C08J 2333/10* (2013.01); *C08J 2377/00* (2013.01)

(58) Field of Classification Search
CPC ...... C08J 3/12; C08J 2300/22; C08J 2325/06; C08J 2331/04; C08J 2333/08; C08J 2333/10; C08J 2377/00; B29B 9/06
USPC ......................................................... 428/402
See application file for complete search history.

(56) References Cited

U.S. PATENT DOCUMENTS

2016/0303768 A1* 10/2016 Usui ....................... B29B 9/065
2016/0375622 A1* 12/2016 Usui ....................... B29B 9/065
264/142

FOREIGN PATENT DOCUMENTS

| JP | 2003-136527 | * | 5/2003 |
| JP | 2003-266432 | * | 9/2003 |
| JP | 2013-163316 | * | 8/2013 |
| JP | 2015-143349 | * | 8/2015 |
| JP | 2015-155194 | * | 8/2015 |

* cited by examiner

*Primary Examiner* — Leszek B Kiliman
(74) *Attorney, Agent, or Firm* — Greenblum & Bernstein, P.L.C.

(57) ABSTRACT

In resin composition pellets containing a desiccant, an object of the present invention is to be able to avoid bridging phenomena and stabilize the feed rate, which is to say, to improve feed stability. Provided is a resin composition pellet containing a thermoplastic resin and a desiccant and having an elliptic cylindrical shape, wherein the ratio of the short diameter b to the long diameter a of the ellipsoidal face S of the pellet P (short diameter b/long diameter a) is 0.5 to 0.9.

16 Claims, 2 Drawing Sheets

RESIN COMPOSITION PELLET

TECHNICAL FIELD

The present invention relates to resin composition pellets having an elliptic cylindrical shape and containing a thermoplastic resin such as a saponified ethylene-vinyl ester-based copolymer (hereinafter also abbreviated as EVOH) and a desiccant, and more particularly relates to a resin composition pellet with which extruder feed stability during melt molding can be improved.

BACKGROUND ART

Various thermoplastic resins are used as molding materials and, for example, EVOH is excellent in terms of transparency, gas barrier properties, aroma retention properties, solvent resistance, oil resistance and the like, and such properties are exploited for use in forming films and sheets, as well as containers such as bottles, serving as food packaging materials, medical packaging materials, industrial chemical packaging materials, agricultural chemical packaging materials, and the like.

EVOH in the form of pellets is melted in an extruder and molded into films, bottles or the like. Thus, if the flowability of the pellets is low, a phenomenon known as bridging occurs, in which the pellet particles form arch structures with each other and clog the supply port area of the extruder (inside the hopper), such that the pellets will not readily be discharged from the discharge port, and the feed rate may become unstable. As a result, the film thickness of the molded product may fluctuate or the appearance may be poor.

Here, Patent Literature 1, for example, states that EVOH pellets in which the ratio of the average diameter to the average length is great, which is to say, pellets having relatively short pellet length, have excellent feed stability, and that films formed using these pellets have excellent quality, with few fish eyes.

Meanwhile, it is known that EVOH even more effectively exhibits functions such as gas barrier properties mentioned above as a result of being designed to be as close to a dry state as possible. Here, so as to ensure a dry state for the EVOH, Patent Literature 2, for example, discloses that low water-content EVOH pellets can be manufactured by mixing EVOH and a desiccant in the molten state, extruding this as a strand form, and cutting this with a specific water cooling process.

CITATION LIST

Patent Literature

[PTL 1] Japanese Unexamined Patent Application Publication No. 2003-136527 A
[PTL 2] Japanese Unexamined Patent Application Publication No. 2013-163316 A

SUMMARY OF INVENTION

Technical Problem

However, in the EVOH pellets containing a desiccant disclosed in Patent Literature 2, for example, even if the ratio of the average diameter to the average length was specified as described in Patent Literature 1, there was room for improvement in terms of avoiding the bridging phenomenon and stabilizing the feed rate, and this was not able to provide satisfactory extruder feed stability.

The present invention was made in view of such matters, and an object thereof is to be able to avoid the bridging phenomenon and stabilize the feed rate, which is to say, to improve feed stability for in resin composition pellets containing a thermoplastic resin such as EVOH and a desiccant.

Solution to Problem

As a result of earnest study, the present inventors have found that, for elliptic cylindrical shaped resin composition pellets containing a desiccant, by causing the short diameter/long diameter ratio of the ellipsoidal face of the pellets (hereinafter, in the present invention, also referred to as the ellipticity) to be in a specific range, the angle of repose is reduced, and further that by reducing the angle of repose, the extruder feed stability is improved.

That is to say, the gist of the present invention is a resin composition pellet containing a resin composition and a desiccant and having an elliptic cylindrical shape, wherein the ratio of the short diameter to the long diameter of the ellipsoidal face of the pellet (short diameter/long diameter) is from 0.5 to 0.9.

Advantageous Effects of Invention

Because, in the resin composition pellets of the present invention, the ellipticity of the pellets is within a specific range, the angle of repose of the pellet particles will be small, and thus the feed stability can be improved.

DESCRIPTION OF EMBODIMENTS

Figure 1:
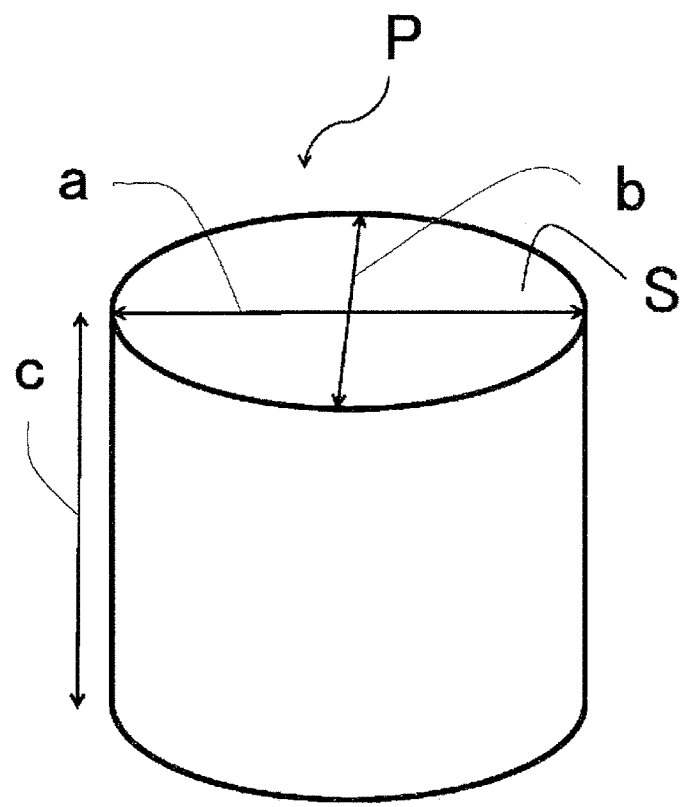
FIG. 1 is a schematic view serving to explain the long diameter a, the short diameter b, and the length c of pellet P having an elliptic cylindrical shape.

The description of the constituent elements set forth below is one example (a representative example) of embodiment of the present invention, and the present invention is not limited to these specifics.

The resin composition pellet of the present invention is a resin composition pellet having an elliptic cylindrical shape and containing a thermoplastic resin such as EVOH and a desiccant. The ratio of the short diameter to the long diameter of the ellipsoidal face of the pellet (short diameter/long diameter) is from 0.5 to 0.9, preferably from 0.55 to 0.85, particularly preferably from 0.6 to 0.8, and still more preferably 0.7 to 0.8. If the short diameter/long diameter ratio is too small, the flowability of the resin composition pellets tends to be inferior and thus the extruder feed stability tends to be inferior. Further, if the short diameter/long diameter ratio is too close to 1, there is a tendency for the bridging phenomenon to occur, and for the feed rate to be unstable, such that the extruder feed stability is inferior.

There are no particular limitations on the method for manufacturing the resin composition pellet of the present invention, and resin composition pellets produced in any shape can be processed so as to satisfy the conditions described above, or can be re-pelletized. Furthermore, in terms of the starting material for the resin composition pellets, the resin composition pellet of the present invention can be efficiently obtained by methods using a starting material that has been dried so as to reduce the water content by a known method in advance, or by applying vacuum suction to extruder vents when melt-kneading a thermoplastic resin such as EVOH and a desiccant. Hereafter, such a method will be described, but the present invention is not limited to this.

<Thermoplastic Resin>

Known thermoplastic resins can be used as the thermoplastic resin in the present invention. Specific examples include polyamide-based resins, polyolefin-based resins, polyester-based resins, polystyrene-based resins, saponified ethylene-vinyl ester-based copolymers, polyvinyl chloride-based resins, polycarbonate-based resins, polyacryl-based resins, ionomers, ethylene-acrylic acid copolymers, ethylene-acrylic acid ester copolymers, ethylene-methacrylic acid copolymers, ethylene-methacrylic acid ester copolymers, and the like. Among these, polyamide-based resins, polyolefin-based resins, polyester-based resins, polystyrene-based resins and saponified ethylene-vinyl ester-based copolymers, are preferred, and a thermoplastic resin containing at least one member selected from this group is preferably used.

The present invention is particularly effective for thermoplastic resins which readily to absorb water and whose physical properties are changed by water absorption.

Specific examples of the polyamide-based resin include aliphatic polyamides such as polycapramide (nylon 6), poly-ω-aminoheptanoic acid (nylon 7), poly-ω-aminononanoic acid (nylon 9), polyundecanamide (nylon 11), polylauryl lactam (nylon 12), polyethylene diamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), caprolactam/lauryllactam copolymer (nylon 6/12), caprolactam/ω-aminononanoic acid copolymer (nylon 6/9), caprolactam/hexamethylenediammonium adipate copolymer (nylon 6/66), lauryllactam/hexamethylenediammonium adipate copolymer (nylon 12/66), ethylenediamine adipamide/hexamethylenediammonium adip ate copolymer (nylon 26/66), and caprolactam/hexamethylene diammonium adipate/hexamethylene diammonium sebacate copolymer (nylon 66/610), and ethylene ammonium adipate/hexamethylene diammonium adipate/hexamethylene diammonium sebacate copolymer (nylon 6/66/610); aromatic polyamides such as polyhexamethylene isophthalamide, polyhexamethylene terephthalamide, polymetaxylylene adipamide, hexamethylene isophthalamide/terephthalamide copolymer, and poly-p-phenylene terephthalamide, and poly-p-phenylene-3-4' diphenyl ether terephthalamide; amorphous polyamides; terminal-modified polyamides in which the terminals of these polyamide-based resins have been modified with a compound containing an amino group or a carboxyl group such as methylbenzylamine or m-xylene diamine; and the like.

Examples of the polyolefin-based resin include polyethylene-based resins such as linear low density polyethylene (LLDPE), low density polyethylene (LDPE), very low density polyethylene (VLDPE), medium density polyethylene (MDPE), and high density polyethylene (HDPE); polypropylene-based resins such as ethylene-propylene (block or random) copolymers, polypropylene, and propylene-α-olefin (the α-olefin having 4 to 20 carbon atoms) copolymers; other polyolefin-based resins such as polybutene, polypentene, and polymethylpentene; modified polyolefin-based resins containing carboxyl groups obtained by chemically bonding an unsaturated carboxylic acid or an anhydride thereof to these resins by an addition reaction, graft reaction or the like; ethylene-vinyl acetate based copolymers; and the like.

Examples of the polyester-based resin include polyethylene terephthalate, polytrimethylene terephthalate, polybutylene terephthalate, polyethylene naphthalate, polybutylene naphthalate, and the like.

Examples of the polystyrene-based resin include polystyrene, modified polystyrene, and the like.

Examples of the polyvinyl chloride-based resin include polyvinyl chloride, polyvinylidene chloride, and the like.

Examples of the polycarbonate-based resin include polycarbonate, modified polycarbonate, and the like.

Examples of the polyacryl-based resin include polyacrylic acid, polymethacrylic acid, and the like.

[EVOH]

Among the aforementioned thermoplastic resins, the effect of the present invention is more remarkably produced in EVOH, since the gas barrier properties thereof are greatly reduced by water.

Hereafter, the EVOH will be described in detail.

The EVOH used in the present invention is a known resin, which is a water-insoluble thermoplastic resin. EVOH is usually produced by copolymerizing a vinyl ester-based monomer and ethylene to obtain an ethylene-vinyl ester-based copolymer, which is saponified. In other words, it primarily includes ethylene structural units and vinyl alcohol structural units, and in some cases includes some amount of vinyl ester structural units remaining after the saponification process. A known polymerization method such as a solution polymerization method can be employed for the aforementioned copolymerization.

In terms of economy, vinyl acetate is usually used as the vinyl ester-based monomer. Other examples include aliphatic vinyl esters such as vinyl formate, vinyl propionate, vinyl valerate, vinyl butyrate, vinyl isobutyrate, vinyl pivalate, vinyl caprate, vinyl laurate, vinyl stearate and vinyl versatate, and aromatic vinyl esters such as vinyl benzoate and the like, and usually these are aliphatic vinyl esters having 3 to 20 carbon atoms, preferably 4 to 10 carbon atoms, and particularly preferably 4 to 7 carbon atoms. These are usually used singly, but multiple types can be used at the same time, as necessary.

Usually, starting materials derived from petroleum such as naphtha are used for the ethylene and the vinyl ester-based monomers, but starting materials derived from natural gas such as shale gas, monomers derived from plant-derived starting materials, which are refined from components such as sugars and starches contained in sugarcane, sugar beet, corn, potato and the like, or components such as cellulose contained in rice, wheat, millet, grass plants and the like may be used.

Furthermore, the ethylene content of the EVOH is determined at the time of polymerization of ethylene and a vinyl ester-based monomer, and does not change before and after saponification. The content ratio of the ethylene structural unit measured in accordance with ISO 14663 is usually 20 to 60 mol %, preferably 20 to 55 mol %, and particularly preferably 25 to 50 mol %. If the ethylene content is too low, impact resistance and processability tend to be inferior, while if this is too great, the gas barrier properties and solvent resistance tend to be low.

Further, the degree of saponification of the EVOH is a value measured by a titration method (JIS K 6726) (where a solution of EVOH uniformly dissolved in a water/methanol solvent is used), and is usually 90 to 100 mol %, preferably 95 to 100 mol %, and particularly preferably 98 to 100%. If the degree of saponification is too low, the gas barrier properties tend to be inferior.

The melt flow rate (hereinafter also referred to as MFR) of the EVOH is a value measured at 210° C. and a load of 2160 g, and is usually 0.1 to 100 g/10 min, preferably 1 to 50 g/10 min, and particularly preferably 2 to 40 g/10 min. If this value is too high or too low, the processability tends to be inferior.

The melting point of the EVOH is a value measured with a differential scanning calorimeter (DSC) at a temperature increase/decrease rate of 10° C./min, and is usually 100 to 220° C., preferably 120 to 210° C., particularly preferably 140 to 200° C.

Note that, in the present invention, in addition to ethylene and vinyl ester-based monomers, copolymerizable ethylenically unsaturated monomers may be copolymerized in a range that does not detract from the properties required for EVOH (for example, 10 mol % or less), and examples of the aforementioned monomers include the following.

Examples include olefins such as propylene, 1-butene, and isobutane; hydroxy group-containing α-olefins such as 2-propen-1-ol, 3-buten-1-ol, 4-penten-1-ol, 5-hexen-1-ol, 3,4-dihydroxy-1-butene, and 5-hexene-1,2-diol, acylated products thereof, and esterified products thereof, wherein esterified products include 3,4-diacyloxy-1-butene, and particularly 3,4-diacetoxy-1-butene and the like. Further included are hydroxyalkyl vinylidenes such as 2-methylene propane-1,3-diol and 3-methylene pentane-1,5-diol; hydroxyalkyl vinylidene diacetates such as 1,3-diacetoxy-2-methylene propane, 1,3-dipropionyloxy-2-methylene propane, and 1,3-dibutylonyloxy-2-methylene propane; and the like. Further included are unsaturated acids or salts thereof such as acrylic acid, methacrylic acid, crotonic acid, (anhydrous) phthalic acid, (anhydrous) maleic acid, and (anhydrous) itaconic acid; and mono- or dialkyl esters wherein the alkyl group has 1 to 18 carbon atoms. Further included are, acrylamides such as acrylamide, N-alkylacrylamides wherein the alkyl group has 1 to 18 carbon atoms, N,N-dimethylacrylamide, and 2-acrylamido-propanesulfonic acid or a salt thereof, acrylamido-propyldimethylamine or an acid salt thereof or a quaternary salt thereof; methacrylamides such as methacrylamide, N-alkylmethacrylamides wherein the alkyl group has 1 to 18 carbon atoms, N,N-dimethylmethacrylamide, 2-methacrylamido-propanesulfonic acid or a salt thereof, methacrylamido-propyldimethylamine or an acid salt thereof and quaternary salt thereof. Further included are N-vinyl amides such as N-vinyl pyrrolidone, N-vinyl formamide, and N-vinyl acetamide; vinyl cyanides such as acrylonitrile and methacrylonitrile; vinyl ethers such as alkyl vinyl ethers, hydroxyalkyl vinyl ethers, and alkoxyalkyl vinyl ethers wherein the alkyl and alkoxy groups have 1 to 18 carbon atoms, vinyl halides such as vinyl chloride, vinylidene chloride, vinyl fluoride, vinylidene fluoride, and vinyl bromide; vinyl silanes such as trimethoxyvinylsilane; as well as allyl acetate, allyl chloride, trimethyl-(3-acrylamido-3-dimethylpropyl)-ammonium chloride, acrylamide-2-methylpropanesulfonic acid, vinyl ethylene carbonate, glycerol monoallyl ether and the like.

Further, the EVOH of the present invention may be subjected to "post-modification" such as urethanization, acetalization, cyanoethylization, and oxyalkylenization, by way of known methods. In particular, EVOH copolymerized with hydroxy group-containing α-olefins, and in particular EVOH having a 1,2-diol on a side chain is preferably used in applications requiring postformability such as stretching and vacuum/pressure forming.

Furthermore, the EVOH used in the present invention may be a mixture with another different EVOH resin, and examples of such another EVOH include one having a different degree of saponification, one having a different degree of polymerization, one having other different copolymerization components and the like.

The content ratio of the thermoplastic resin, and particularly EVOH, in the total resin composition is preferably 60 wt % or more, particularly preferably 60 to 99 wt %, still more preferably 70 to 98 wt %, and especially preferably 80 to 95 wt %. If the amount of EVOH is too low, the effects of the EVOH, such as the gas barrier properties tend to be insufficient.

In particular, when EVOH is used as the thermoplastic resin, in addition to the EVOH, other thermoplastic resins may be contained at 30 wt % or less, preferably 20 wt % or less, and particularly preferably 10 wt % or less. Examples of the other thermoplastic resins include, in addition to the aforementioned thermoplastic resins: polyvinylidene chloride; vinyl ester-based resins; polyester elastomers; polyurethane elastomers; chlorinated polyethylene; chlorinated polypropylene; and the like.

Among these, if a multilayer structure is to be formed using resin composition pellets of the present invention that use EVOH as the thermoplastic resin, and this is to be applied to a food packaging material, with a view to preventing elution of the EVOH from the ends of the packaging material after the packaging material is subjected to hot water sterilization treatment, it is preferable that a polyamide-based resin be combined. Polyamide-based resin is capable of forming a network structure by way of interaction between the amide bonds and OH groups and/or ester groups in the EVOH, which can prevent elution of EVOH when hot water sterilization treatment is performed. Accordingly, if the resin composition pellets are to be used in a packaging material for retort foods or boiled foods, it is preferable to include a polyamide-based resin.

If EVOH is used as the thermoplastic resin and a polyamide-based resin is further contained in the resin composition pellets of the present invention, the formulation ratio for the EVOH/polyamide-based resin (weight ratio) is usually 99/1 to 60/40, preferably 95/5 to 70/30, and particularly preferably 95/5 to 80/20. If the ratio is within the aforementioned range, it tends to be easier to achieve both the effect of preventing elution of the EVOH when hot water sterilization treatment is performed and good gas barrier properties.

If a polyamide-based resin is combined in such resin composition pellets, pellets comprising a homogeneous mixture of the EVQH, the subsequently described desiccant and the polyamide-based resin are preferred. Alternately, these may be core-in-sheath structure pellets having a mixture of the EVOH and a desiccant as a core and a polyamide-based resin as a sheath, or core-in-sheath structure pellets having a polyamide-based resin as a core and a mixture of the EVOH and a desiccant as a sheath.

<Desiccant>

Commonly known hygroscopic compounds and water-soluble desiccants are used as the desiccant that is used in the present invention. Such a desiccant is generally combined for the purpose of absorbing water in the thermoplastic resin. This makes it possible to prevent deterioration of the quality of the thermoplastic resin due to environmental changes such as humidity and temperature, and in particular, in the case of EVOH, it is possible to prevent deterioration of gas barrier properties. In particular, if a packaging material having a layer of the resin composition produced by molding the resin composition pellets of the present invention is subjected to a hot water sterilization treatment, water that has infiltrated into the resin composition layer as a result of the hot water sterilization treatment is absorbed by the desiccant, which prevents disruption of the hydrogen bonds between the molecules in the EVOH matrix, whereby the deterioration of the gas barrier performance can be suppressed.

From among these, water-soluble desiccants are preferred, and hydrate-forming metal salts are particularly preferred. Because hydrate-forming metal salts have the property of incorporating water molecules as water of crystallization, it is thought that water that has infiltrated into the resin composition layer due to the hot water sterilization treatment is absorbed, which suppresses deterioration of the quality of the thermoplastic resin, and in particular deterioration of gas barrier performance can be suppressed in the case of EVOH.

In the course of the earnest study undertaken by the present inventors into the problems that the present invention is intended to solve in terms of improving the extruder feed stability, it was noticed that, in resin composition pellets containing a thermoplastic resin and the aforementioned desiccant and having an elliptic cylindrical shape, the ratio of the short diameter to the long diameter of the ellipsoidal face of these pellets (short diameter/long diameter) was small. In terms of the reason, it is thought that, this is because, when manufacturing a resin composition pellet including a thermoplastic resin and the aforementioned desiccant, the thermoplastic resin serving as a starting material and the desiccant and the like originally include small amounts of water, and in a resin composition that is obtained by melt mixing with such water present in the system, the desiccant absorbs water in the resin composition, such that the volume of the resin composition decreases. In particular, it is thought that such water absorption and volume reduction progress after being extruded from the extruder in a strand form, and as a result, the ratio of the short diameter to the long diameter of the ellipsoidal face of the pellets in the resin composition pellets produced (short diameter/long diameter) decreases.

Furthermore, as a result of earnest study, the present inventors have found that, by causing the ratio (short diameter/long diameter) of the short diameter to the long diameter of the ellipsoidal face of such resin composition pellets to be within a specific range, the angle of repose is decreased, and further that by reducing the angle of repose, the extruder feed stability is improved.

Examples of the hygroscopic compound include silica gel, bentonite, molecular sieves, super absorbent resins and the like.

Examples of the water-soluble desiccant include sodium chloride, sodium nitrate, sugar, trilithium phosphate, sodium metaphosphate, sodium polyphosphate, various hydrate-forming metal salts, and the like.

A hydrate-forming metal salt used in the present invention is a salt capable of absorbing water as water of crystallization, and while there is no limitation on the manufacturing method, for example, it can be synthesized as a hydrate and this can be dried/dehydrated for use. In terms of hygroscopicity it is preferable that this be made completely dehydrated (anhydrous) by way of drying/dehydration, but this may also be a partial dehydrate (a hydrate at a level below saturation).

Examples of metals comprised by the hydrate-forming metal salt include monovalent, divalent, or trivalent metals, wherein examples of the monovalent metals include alkali metals such as sodium and potassium. Furthermore, examples of the divalent metals include alkaline earth metals such as beryllium, magnesium and calcium, and transition metals capable of forming divalent ions such as copper, zinc, and iron. Further, examples of the trivalent metals include aluminum, iron and the like. Among these, sodium and magnesium are preferred metals, and magnesium is a particularly preferred metal.

Further, examples of the acid comprised by the hydrate-forming metal salt include sulfuric acid, carboxylic acid, phosphoric acid, boric acid, nitric acid, carbonic acid, sulfurous acid and the like. Among these, sulfuric acid, carboxylic acid, and phosphoric acid are preferred acids, and sulfuric acid and carboxylic acid are particularly preferred acids.

Specific examples of hydrate-forming metal salts include chlorides such as cobalt chloride, calcium chloride, and magnesium chloride; phosphate salts such as monosodium dihydrogen phosphate, monohydrogen disodium phosphate, trisodium phosphate, sodium pyrophosphate, and calcium hydrogen phosphate; carboxylic acid salts such as disodium succinate, sodium tartrate, trisodium citrate, and trimagnesium dicitrate; and sulfates such as sodium sulfate, potassium sulfate, and magnesium sulfate. Among these, salts of sulfuric acid or a salts of a carboxylic acid having 4 to 10 carbon atoms such as succinic acid salts or citric acid salts are preferred in terms of recovery of gas barrier properties after retort treatment, and in particular, magnesium sulfate and the partially dehydrated products, or the completely dehydrated product, of trimagnesium dicitrate are preferably used.

A hydrate-forming metal salt such as described above forms a hydrate having water of crystallization. Examples of sulfuric acid metal salts having water of crystallization include monovalent metal salts such as sodium sulfate ($Na_2SO_4 \cdot 10H_2O$) and potassium sulfate ($K_2SO_4 \cdot 1H_2O$); alkaline earth metal salts such as beryllium sulfate ($BeSO_4 \cdot 4H_2O$), magnesium sulfate ($MgSO_4 \cdot 7H_2O$), and calcium sulfate ($CaSO_4 \cdot 2H_2O$); transition metal salts such as copper sulfate ($CuSO_4 \cdot 5H_2O$), zinc sulfate ($ZnSO_4 \cdot 7H_2O$), and iron sulfate ($FeSO_4 \cdot 7H_2O$); aluminum sulfate ($Al_2(SO_4)_3 \cdot 16H_2O$) and the like. Note that the chemical formulas shown in brackets above represent the chemical formula of the saturated hydrate of each metal.

Specific examples of the above-mentioned carboxylic acid salt hydrates include, in terms of monovalent carboxylic acid salts, acetate salts such as sodium acetate ($CH_3COONa \cdot 3H_2O$) and calcium acetate (($CH_3COO)_2Ca \cdot H_2O$); lactate salts such as calcium lactate (($CH_3CH(OH)COO)_2Ca \cdot 5H_2O$); gluconate salts such as zinc gluconate (($CH_2(OH)CH(OH)CH(OH)CH(OH)CH(OH)COO)_2Zn \cdot 3H_2O$) and calcium gluconate (($CH_2(OH)CH(OH)CH(OH)CH(OH)CH(OH)COO)_2Ca \cdot H_2O$}; benzoate salts such as magnesium benzoate (($C_6H_5$ $COO)_2Mg.4H_2O$) and calcium benzoate (($C_6H_5$ $COO)_2Ca.3H_2O$); malate salts such as sodium malate ($NaOOCCH(OH)CH_2COONa).3H_2O$) and calcium malate (($OOCCH(OH)CH_2COO)Ca.H_2O$); and in terms of divalent carboxylic acid salts, oxalate salts such as potassium oxalate (($COONa)_2.H_2O$) and ammonium oxalate (($COONH_4)_2.H_2O$); succinate salts such as disodium succinate (($CH_2COONa)_2.6H_2O$) and dipotassium succinate (($CH_2COOK)_2.3H_2O$); glutamate salts such as potassium hydrogen L-glutamate ($HOOCCH(NH_2)CH_2CH_2COOK.H_2O$), sodium hydrogen L-glutamate ($HOOCCH(NH_2)CH_2CH_2COONa.H_2O$), and magnesium L-glutamate (($OOCCH(NH_2)CH_2CH_2COO)Mg.4H_2O$); asparagine acid salts such as sodium L-asparaginate ($HOOCCH_2CH(COOH)NH_2.H_2O$); tartaric acid salts such as sodium hydrogen L-tartarate ($HOOCCH(OH)CH(OH)COONa.H_2O$), and disodium L-tartrate ($NaOCOCH(OH)CH(OH)COONa.2H_2O$); in terms of trivalent carboxylic acid salts, citrate salts such as tripotassium citrate ($KOCOCH_2C(OH)(COOK)CH_2COOK.H_2O$), trisodium citrate (($C_3H_5O(COO)_3)Na_3.2H_2O$), trimagnesium dicitrate (($C_3H_5O(COO)_3)_2Mg_3.14H_2O$), and tricalcium dicitrate (($C_3H_5O(COO)_3)_2Ca_3.4H_2O$); and in terms of as a tetravalent carboxylic acid salts, EDTA carboxylic acid salts, such as EDTA tetraacetate salts such as calcium disodium ethylenediaminetetraacetate ($Ca(OOCCH_2)_2NCH_2CH_2N(CH_2COONa)_2.2H_2O$), disodium ethylenediaminetetraacetate (($HOOCCH_2)_2NCH_2CH_2N(CH_2COONa)_2.2H_2O$).

Note that, the chemical formulas shown in parentheses above represent chemical formulas of the hydrates having the most hydrated water.

The hydrate-forming metal salt used as a desiccant is a partially dehydrated product or a completely dehydrated product capable of forming a hydrate as described above. A partially dehydrated product is one in which a some of the water of crystallization in the saturated hydrate has been dehydrated, and normally, when the amount of water of crystallization in the saturated hydrate of the metal salt is considered to be 100%, this corresponds to a hydrate of the metal salt having less than 90% of the amount of water of crystallization, on a weight basis. It is preferable to use a partially dehydrated product of a sort with which the saturated hydrate can stably exist at room temperature, and thus it is preferable to use a partial hydrate dehydrated to less than 70% water of crystallization content, and particularly preferably a completely dehydrated product.

The content ratio of the desiccant is preferably 40 wt % or less, particularly preferably 1 to 40 wt %, still more preferably 2 to 30 wt %, and especially preferably 5 to 20 wt %, with respect to the thermoplastic resin.

Note that the content ratio of the desiccant with respect to the thermoplastic resin is, in other words, the proportion of the desiccant contained in the total content of the thermoplastic resin and the desiccant. Furthermore, if the desiccant is a partially dehydrated product of a metal salt having water of crystallization, the content ratio of the desiccant is the mixing weight ratio in terms of weight as a completely dehydrated product.

If the content of the desiccant is too great, there is a tendency for the transparency to be impaired and for the screen mesh in the molding machine to clog during molding, due to aggregation, while if this is too low, there is a tendency for the effect of removing water that has been included in the EVOH to be insufficient and for the gas barrier properties after hot water sterilization treatment, such as boiling treatment or retort treatment, to be insufficient.

The desiccant-containing resin composition pellet of the present invention may suitably contain a compounding agent, in addition to the aforementioned thermoplastic resin and desiccant. The amount of such a compounding agent is usually 5 wt % or less with respect to the resin composition. Examples of such compounding agents include fillers such as talc, calcium carbonate, mica and glass fiber, plasticizers such as paraffin oil, antioxidants, thermal stabilizers, light stabilizers, ultraviolet absorbers, oxygen absorbers, neutralizers, lubricants, antifogging agents anti-blocking agents, slip agents, crosslinking agents, crosslinking aids, colorants, flame retardants, dispersants, surfactants, antistatic agents, antibacterial agents, curing agents, blowing agents, crystal nucleating agents, biodegradation additives, fluorescent whitening agents, silane coupling agents, and the like, and one or multiple compounding agents of any sort may be contained. Furthermore, known additives such as conjugated polyene compounds, enediol group-containing substances, and aliphatic carbonyl compounds can suitably be combined.

In particular, when EVOH is used as the thermoplastic resin, it is preferable to combine a heat stabilizer described above. In terms of such a heat stabilizer, for the purpose of improving various physical properties such as thermal stability during melt molding, organic acids such as acetic acid, propionic acid, butyric acid, lauric acid, stearic acid, oleic acid, and behenic acid, or salts thereof such as salts of alkali metals (sodium, potassium or the like), salts of alkaline earth metals (calcium, magnesium or the like), and zinc salts; or inorganic acids such as sulfuric acid, sulfurous acid, carbonic acid, phosphoric acid, and boric acid, or salts thereof such as salts of alkali metals (sodium, potassium, or the like), salts of alkaline earth metals (calcium, magnesium or the like), and zinc salts, or the like may be combined. Among these, it is particularly preferred to combine acetic acid, boric acid and boron compounds including salts thereof, acetic acid salts, and phosphoric acid salts.

If acetic acid is combined, the amount thereof combined is usually 0.001 to 1 part by weight, preferably 0.005 to 0.2 parts by weight, and particularly preferably 0.010 to 0.1 parts by weight, with respect to 100 parts by weight of the EVOH. When the amount of acetic acid combined is too low, the effect of combining acetic acid tends not to be sufficiently produced, while conversely, if this is too great, it tends to be difficult to produce a uniform film.

Furthermore, when a boron compound is combined, the amount combined in terms of the boron with respect to 100 parts by weight of the EVOH (analyzed by ICP emission spectrometry after ashing), is usually 0.001 to 1 part by weight, preferably 0.002 to 0.2 parts by weight, and particularly preferably 0.005 to 0.1 parts by weight. If the amount of the boron compound combined is too low, the effect of combining the boron compound tends not to be sufficiently produced, while conversely, if this is too great, it tends to be difficult to produce a uniform film.

Furthermore, the amount of acetic acid salt and phosphoric acid salt (including hydrogen phosphate salt) combined, in terms of the metal with respect to 100 parts by weight of the EVOH (analyzed by ICP emission spectrometry after ashing) is usually 0.0005 to 0.1 parts by weight, preferably 0.001 to 0.05 parts by weight, and particularly preferably 0.002 to 0.03 parts by weight. If the amount combined is too low, the effect of combining it tends not to be sufficiently produced, while conversely, if this is too great, it tends to be difficult to produce a uniform film. Note that, if two or more are combined, the total amount thereof is preferably within the range of the amounts combined described above.

There are no particular limitations on the methods for combining the acetic acid, boron compound, acetic acid salt, or phosphoric acid salts. Examples include: i) a method of contacting a porous precipitate of EVOH having a water content ratio of 20 to 80 wt % with an aqueous solution of the combined substance, so that the combined substance is included in the porous precipitate and then dried; ii) a method of, after including the combined substance in a homogeneous solution of EVOH (water/alcohol solution or the like), extruding this into a coagulating liquid in the form of a strand, and then cutting the strand produced into pellets and further subjecting this to drying treatment; iii) a method of preforming melt-kneading in an extruder or the like, after batch mixing EVOH and the additives; iv) a method of neutralizing an alkali (sodium hydroxide, potassium hydroxide, or the like) used in the saponification treatment during manufacture of the EVOH with an organic acid such as acetic acid and adjusting the remaining amount of organic acid such as acetic acid and by-produced salts by way of water washing treatment; and the like.

In order to more remarkably produce the effect of the present invention, methods i) and ii), which are excellent in terms of the dispersibility of the combined substance and, in cases where the organic acid and a salt thereof are contained, method iv), are preferred.

<Manufacture of Resin Composition Pellets>

The resin composition pellets of the present invention can be manufactured, for example, a way of the extrusion process, water cooling process, water removal process and cutting process described below.

[Extrusion Process]

The extrusion process is a process in which a resin composition containing the thermoplastic resin, and particularly the EVOH, and a desiccant is melt-kneaded in an extruder and the resin composition containing the desiccant is extruded from the die of this extruder into a strand. A single screw extruder or a twin screw extruder can be used as the extruder/kneader, but a twin screw extruder is preferable in that sufficient kneading can be produced with moderate shearing.

The L/D (screw length/screw diameter) of such extruder that is used is usually 10 to 80, particularly 15 to 70, and more preferably 20 to 60. If the L/D is too low, there is a tendency for kneading to be insufficient and discharge to be unstable, while conversely, if it is too high, the resin temperature will be too high due to heating due to excessive shearing, which tends to cause deterioration of the resin.

The extruder screw speed used is usually in the range of 10 to 1000 rpm, particularly 30 to 700 rpm, and more preferably 50 to 500 rpm. If the speed is too low, the discharge tends to become unstable, while if it is too high, it tends to cause deterioration of the resin due to heating due to excessive shearing.

The resin temperature in the extruder cannot be set forth in an unconditional manner, as it depends on the desired processing quantity and the like, but this is usually carried out at 140 to 280° C. In terms of the efficiency with which the water is removed, it is effective to perform this at high temperatures, and specifically a range of, 180 to 270° C., and particularly 190 to 260° C. is preferably used.

If the resin temperature is too high, the thermoplastic resin, and in particular the EVOH, tends to thermally deteriorate and discolor, while conversely, if resin temperature is too low, there is a tendency for the viscosity of the resin to be high such that a greater load is placed on the extruder, and for the thermoplastic resin not to reach a sufficiently molten state.

There are no particular limitations on the method for adjusting the resin temperature but, normally, a method of setting the temperature of the cylinder in the extruder as appropriate or a method of controlling by the rotational speed of the extruder is used.

In the present invention, melt-kneading in an extruder is preferably carried out under a reduced pressure conditions, and by performing the melt-kneading under reduced pressure conditions of, for example, a degree of vacuum of −100 to −10 kPa, preferably −95 to −30 kPa, and particularly preferably −90 to −50 kPa, the ellipticity of the resin composition pellets can easily adjusted within the range stipulated in the present invention.

In the present invention, degree of vacuum means the relative pressure, with atmospheric pressure as standard (an atmospheric pressure standard of 0) and is expressed as a negative pressure for a vacuum state. The degree of vacuum can be measured by reading the gauge pressure value on a vacuum gauge mounted in the vicinity of an extruder vent.

If the degree of vacuum is too low, such that the pressure reduction is insufficient, there is a tendency for water not to be efficiently discharged from the molten resin, and for the strand to foam. If the degree of vacuum is too high such that the pressure reduction is excessive, there is a tendency for ambient air to be sucked in via gaps in the extruder other than the vent openings, and thus for oxygen to be mixed in the molten resin, such that there is greater discoloration due to oxidative degradation.

Note that, in order to carry out melt-kneading under reduced pressure conditions, it is preferable to use a vented extruder having vent openings in the cylinder, which are connected to a vacuum pump, for example.

The number of vent openings provided in such an extruder is usually in the range of 1 to 6, and particularly preferably 2 to 5. If the number of such vent openings is too small, there is a tendency of the ellipticity of the resin composition pellet to decrease, while conversely, if there are too many, there will be more chances for the resin to make contact with the air, and thus for the resin composition produced to be degraded or discolored.

In terms of the shape of the vent openings, well-known shapes such as ports, and long vents are used. When using an extruder having a plurality of vent openings, the vent openings may be of the same kind, or different kinds may be combined.

The shape of the die aperture on the extruder used in the present invention is usually an elliptical shape or a slightly deformed circular shape, but dies with other shapes that can produce an EVOH pellet ultimately having the intended shape can also be used. The length of the land in this die is preferably 1 to 50 mm, and particularly preferably 3 to 30 mm, and the inner diameter of the die hole is preferably 1 to 6 mm, and particularly preferably 3 to 5 mm.

[Water Cooling Process]

The water cooling process is a process for cooling the strand-form resin composition (strand) that is extruded from the die of the extruder while being moved through water in a water tank.

The temperature of the water in the water tank is preferably −10 to 40° C., particularly preferably 0 to 30° C., and still more preferably 5 to 25° C. The travel speed (take-up speed) of the strand is preferably 5 to 100 m/min, and particularly preferably 10 to 50 m/min, and the distance of immersion of the strand in the water is preferably 5 to 50 cm, and particularly preferably 10 to 40 cm. If the immersion distance is too short, there is a tendency for shape defects to occur in the cut cross-section due to insufficient cooling of the strand. If the immersion distance is too long, inferior quality in terms of foaming tends to occur, due to water absorption by the strand.

[Water Removal Process]

The water removal process is a process of removing water from the surface of the strand that is taken out from the water, and it is particularly desirable, in case where EVOH is used for the thermoplastic resin, that an air sucker is used for the resin composition containing the desiccant. An air sucker refers to a device which has a recess capable of holding a strand, and by causing this recessed portion to be at a reduced pressure at all times, water present on the surface of the strand is suctioned so that water can be removed from the surface thereof. The suction conditions for the air sucker are such that a reduced pressure is set that allows water to be suctioned over the entire strand. The water removal process is preferably carried out, immediately after, for example, at 0.1 to 1 sec. after the strands are taken out up from the water in the water cooling process.

[Cutting Process]

The cutting process is a process of manufacturing the resin composition pellets of the present invention by cutting to an appropriate length while drawing the strand, from which water has been removed in the water removal process, onto a cutter roll.

The pellets produced by cutting have an elliptic cylindrical shape. In the present invention, an elliptic cylindrical shape means a cylindrical shape in which, when the direction of extrusion from the die of the extruder is the longitudinal direction, the plane orthogonal to the longitudinal direction is elliptical. The distance in the longitudinal direction of the resin composition pellet of the present invention is referred to as the length, the distance of the minor axis in a plane orthogonal to the longitudinal direction (ellipsoidal face) is referred to as the short diameter, and the distance of the major axis is referred to as the long diameter. Such a "plane orthogonal to the longitudinal direction" is elliptical, and such a plane in the present invention is also referred to as the "ellipsoidal face of the pellet." Note that, the length, short diameter, and long diameter of the resin composition pellets are average values obtained by being measured each once with calipers, using five pellets arbitrarily selected from the manufactured resin composition pellets.

This will be described more specifically with reference to FIG. 1.

FIG. 1 is a schematic view serving to explain the long diameter a, the short diameter b, and the length c of a pellet P having an elliptic cylindrical shape, wherein c in the drawing indicates the longitudinal distance of the pellet P, which is to say the length of the pellet P. The ellipsoidal faces S orthogonal to the longitudinal direction of the pellet P are formed by cutting the strand, and constitute the top face and the bottom face of the pellet P. In the present invention, the distance of the major axis on the ellipsoidal face S of the pellet P is denoted as the long diameter a, and the distance of the minor axis that is a perpendicular bisector of the major axis is denoted as the short diameter b respectively.

Note that, if the long diameter a or short diameter b is difficult to be measured due to, for example, defects at the ends of the pellet P to be measured, the pellet P can be cut, at an arbitrary place in the longitudinal direction of the pellet P, such that the cut face is orthogonal to the longitudinal direction and the long diameter or the short diameter on that cut face can be regarded as the long diameter a or the short diameter b on the ellipsoidal face S.

There are no specific limitations on the length, the long diameter and the short diameter of the pellet of the present invention, but the length can be selected as appropriate from the range of, usually 1 to 10 mm, preferably 1.5 to 5 mm, and particularly preferably 2 to 4 mm.

The long diameter and the short diameter of the ellipsoidal face of the pellet can be selected as appropriate from the range of, usually 1 to 10 mm, preferably 1.5 to 5 mm, and particularly preferably 1.8 to 4 mm.

Specifically, the long diameter is usually 1 to 10 mm, preferably 2 to 5 mm, particularly preferably 2.8 to 3.5 mm, and still more preferably 3 to 3.5 mm. Specifically, the short diameter is usually 1 to 10 mm, preferably 1.5 to 3 mm, particularly preferably more than 1.9 mm to 2.8 mm or less, and still more preferably 2.1 to 2.5 mm. When the long diameter and the short diameter of the ellipsoidal face of the pellet are within the ranges described above, there is a tendency for the feed stability to be readily improved and for good molded articles to be easily produced, even if molding is performed with the discharge speed increased, when melt molding using the pellets.

The resin composition pellet of the present invention is a resin composition pellet having an elliptic cylindrical shape, wherein the ratio of the short diameter to the long diameter of the ellipsoidal face of the pellet (short diameter/long diameter) is within a specific range.

The ratio of the short diameter to the long diameter of the ellipsoidal face of the pellet (short diameter/long diameter) is 0.5 to 0.9, preferably 0.55 to 0.85, particularly preferably 0.6 to 0.8, and still more preferably 0.7 to 0.8. When the ratio of the short diameter/long diameter is within the ranges described above, the feed stability is improved such that good molded articles can be produced, even if molding is performed with the discharge speed increased, when melt molding using the pellets.

In the resin composition pellet of the present invention, the ratio of the long diameter of the ellipsoidal face of the pellet to the length of the pellet (long diameter/length) is usually 0.2 to 2, preferably 0.7 to 1.3, particularly preferably 0.8 to 1.2, and still more preferably 0.9 to 1.1. When the ratio of the long diameter/length is within the ranges described above, there is a tendency for the feed stability to be readily improved and for good molded articles to be easily produced, even if molding is performed with the discharge speed increased, when melt molding using the pellets.

The angle of repose (°) of the resin composition pellets of the present invention is usually from 30° to less than 45°, and preferably 40 to 44°. When the angle of repose is within the ranges described above, there is a tendency for the feed stability to be readily improved and for good molded articles to be easily produced, even if molding is performed with the discharge speed increased, when melt molding using the pellets.

Note that, the angle of repose can be measured as follows. The resin composition pellets are freely poured into a horizontally placed glass container (inner dimensions: diameter of 9.5 cm, and height of 2 cm), through a glass funnel with a stem diameter of 8 mm, from 10 cm above the top face of the container until the resin composition pellets overflow from the container. The height (H (cm)) of the conical pile of the resin composition pellets resulting from this, having, as a base, the horizontal plane of the upper face of the container, is measured, and the angle of repose is calculated according to the following equation (3). Measurement is performed three times, and the average value is taken as the angle of repose.

$$\text{Angle of repose }(°)=\text{Arctan}(H/4.75) \quad (3)$$

Here, Arctan indicates an arctangent function.

The resin composition pellets of the present invention are molded into films, sheets, containers, fibers, rods, pipes, various molded articles, or the like, by melt molding or the like, and the pulverized products thereof (when the collected items are reused, or the like) are supplied to melt molding once again. Extrusion molding methods, injection molding methods and the like can be employed as such the melt molding methods. The resultant films, sheets, bags made from drawn films, containers consisting of cups, trays, tubes, bottles and the like, as well as lids materials, can be useful as various types of packaging material containers for foods in general, as well as condiments such as mayonnaise and dressings, fermented foods such as miso, oil and fat based foods such as salad oils, beverages, cosmetics, pharmaceuticals, and the like.

In particular, since layers made from the resin composition pellets of the present invention have excellent gas barrier properties after hot water sterilization treatment, this is particularly useful as a packaging material for food that will be subjected to hot water sterilization treatment.

EXAMPLES

Hereafter, the present invention is described in detail by way of examples, but so long as there is no departure from the gist thereof, the present invention is not limited to the following examples. Note that, in the examples, "parts" and "%" are on a weight basis.

Example 1

Manufacture of Resin Composition Pellets

Melt-kneading was performed with a twin screw extruder having two mixing zones, under the reduced pressure conditions shown in Table 1, with 90 parts of EVOH having an ethylene structural unit content of 29 mol %, a degree of saponification of 99.6%, an MFR of 4 g/10 min (210° C., 2160 g load) and a volatile component of 0.2%, serving as the EVOH, and 10 parts of trimagnesium dicitrate anhydrous (made by Jost Chemical Co.), serving as the desiccant. After extruding the melt-kneaded resin composition into a strand-form, the strands were cooled in a water tank and cut with a drum-type pelletizer to obtain resin composition pellets of Example 1 having an elliptic cylindrical shape.

(Manufacturing Conditions)
Twin Screw Extruder: Diameter 32 mm, L/D=56 (made by Japan Steel Works, Ltd.)
Extruder temperature settings:
C2/C3/C4/C5/C6/C7/C8/C9/C10/C11/C12/C13/C14/C15/C16/D=90/120/180/220/230/230/230/230/230/230/230/230/230/230/230/230
Screw speed: 270 ppm
Discharge rate: 30 kg/hour
Strand cooling: water cooling (immersion length 25 cm)
Take up rate: 25 m/min
Pressure reduction method: a vacuum pump was connected and pressure was reduced via the C14 vent opening (the degree of vacuum during operation was measured by installing a vacuum gauge near the vent opening)

Examples 2 and 3, Comparative Example 1, and Reference Examples 1 and 2

Resin composition pellets for Examples 2 and 3 and Comparative Example 1 were obtained in the same manner as in Example 1 except that the reduced pressure conditions were changed to those set forth in Table 1.

Furthermore, the resin composition pellets for Reference Examples 1 and 2 were obtained in the same manner as in Example 1 under the reduced pressure conditions set forth in Table 1 using only EVOH without combining a desiccant, and the length, short diameter and long diameter of the pellets were measured with calipers. The evaluation results were shown in Table 1.

Next, the pellet ellipticity, the ratio of pellet long diameter/pellet length and the angle of repose were evaluated as follows for the resin composition pellets produced in Examples, Comparative Examples, and Reference Examples, and the evaluation results were set forth in Table 2.

[Evaluation of Pellet Ellipticity]

The long diameter a (mm) and the short diameter b (mm) of the ellipsoidal face were found by measuring the ellipsoidal face of the elliptic cylindrical resin composition pellets with calipers, and the pellet ellipticity was calculated by the following Equation (1). Measurements were performed five times, and the average value was taken as the pellet ellipticity.

$$\text{Pellet ellipticity}=b/a \quad (1)$$

[Evaluation of Pellet Long Diameter/Pellet Length Ratio]

The long diameter a (mm) and the pellet length c (mm) of the ellipsoidal face were found by measuring the ellipsoidal face of the elliptic cylindrical resin composition pellets with calipers, and the ratio of the long diameter of the ellipsoidal face of the pellet to the length of the pellet (long diameter/length) was calculated by way of the following Equation (2). Measurements were performed five times, and the average value was taken as the long diameter/length ratio.

$$\text{Pellet long diameter/pellet length}=a/c \quad (2)$$

[Evaluation of the Angle of Repose]

The resin composition pellets were freely poured into a horizontally placed glass container (inner dimensions: diameter of 9.5 cm, height of 2 cm), through a glass funnel with a stem diameter of 8 mm, from 10 cm above the top face of the container until the resin composition pellets overflowed from the container. The height (H (cm)) of the conical pile of the resin composition pellets resulting from this, having, as a base, the horizontal plane of the upper face of the container, was measured and the angle of repose was calculated according to the following Equation (3). Measurements were performed three times, and the average value was taken as the angle of repose.

$$\text{Angle of repose }(°)=\text{Arctan}(H/4.75) \quad (3)$$

Here, Arctan indicates an arctangent function.

TABLE 1

|  | Composition | Degree of vacuum | Pellet shape | | |
|---|---|---|---|---|---|
|  |  |  | Long diameter a (mm) | Short diameter b (mm) | Length c (mm) |
| Example 1 | EVOH (29 mol %)/trimagnesium dicitrate = 90/10 | −90 kPa | 3.01 | 2.21 | 3.1 |
| Example 2 | EVOH (29 mol %)/trimagnesium dicitrate = 90/10 | −60 kPa | 3.12 | 2.22 | 3.1 |
| Example 3 | EVOH (29 mol %)/trimagnesium dicitrate = 90/10 | −30 kPa | 3.47 | 1.99 | 3.1 |
| Comparative Example 1 | EVOH (29 mol %)/trimagnesium dicitrate = 90/10 | OFF | 4.00 | 1.90 | 3.1 |
| Reference Example 1 | EVOH (29 mol %) | OFF | 3.12 | 2.24 | 3.1 |
| Reference Example 2 | EVOH (29 mol %) | −90 kPa | 3.06 | 2.23 | 3.1 |

TABLE 2

|  | Short diameter/long diameter (Pellet ellipticity) | Long diameter/length | Repose angle (°) |
|---|---|---|---|
| Example 1 | 0.73 | 0.97 | 43 |
| Example 2 | 0.71 | 1.00 | 43 |
| Example 3 | 0.57 | 1.12 | 44 |
| Comparative Example 1 | 0.48 | 1.29 | 45 |
| Reference Example 1 | 0.72 | 1.01 | 42 |
| Reference Example 2 | 0.73 | 0.99 | 42 |

Based on a comparison between Examples 1 and 2 and Comparative Example 1 shown in Table 1 and Table 2, it is understood that, when manufacturing resin composition pellets containing EVOH and a desiccant, pellets having a large pellet ellipticity can be obtained by vacuum suctioning at the extruder vents.

Meanwhile, as shown by the results of Reference Examples 1 and 2, when manufacturing the EVOH pellets not containing a desiccant, a large pellet ellipticity results, whether or not the vents of the extruder are vacuum suctioned.

Examples 4, 5 and 6, and Comparative Example 2

Other than using magnesium sulfate anhydride (made by Tomita Pharmaceutical Co., Ltd.) in place of trimagnesium dicitrate anhydrous as the desiccant, and changing the reduced pressure conditions to the conditions set forth in Table 3, the resin composition pellets of Examples 4, 5 and 6, and Comparative Example 2 were produced in the same manner as in Example 1.

The pellet ellipticity, the ratio of pellet long diameter/pellet length and the angle of repose were evaluated as described above for the resin composition pellets produced in Examples 4, 5 and 6, and Comparative Example 2, and the evaluation results were set forth in Table 4.

Figure 2:
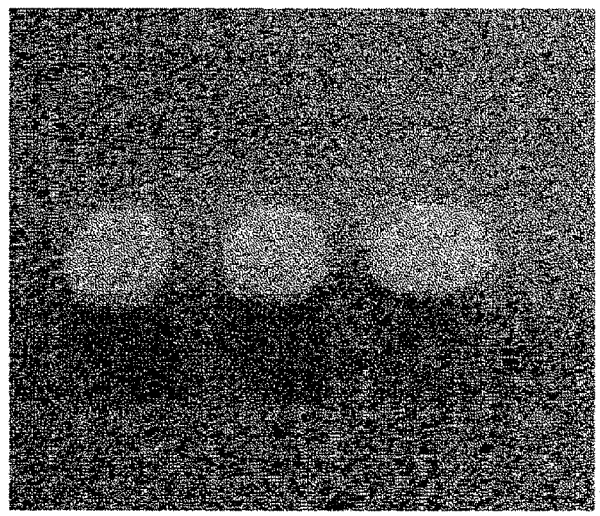
FIG. 2 is a photograph in which resin composition pellets from Example 4 are placed on a flat plate, with one ellipsoidal face facing downward, and the other ellipsoidal faces are photographed from above.
Figure 3:
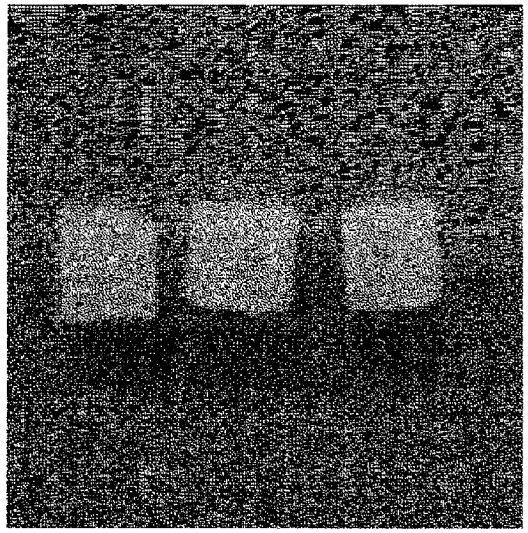
FIG. 3 is a photograph in which resin composition pellets from Example 4 are placed on a flat plate, with a side face facing downward, and the opposite side faces are photographed from above.
Figure 4:
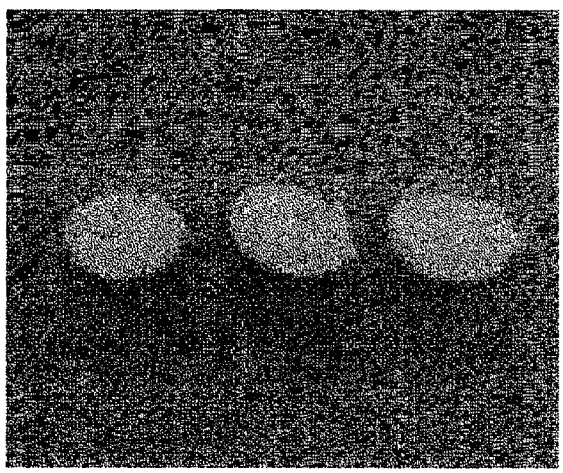
FIG. 4 is a photograph in which resin composition pellets from Comparative Example 2 are placed on a flat plate, with one ellipsoidal face facing downward, and the other ellipsoidal faces are photographed from above.
Figure 5:
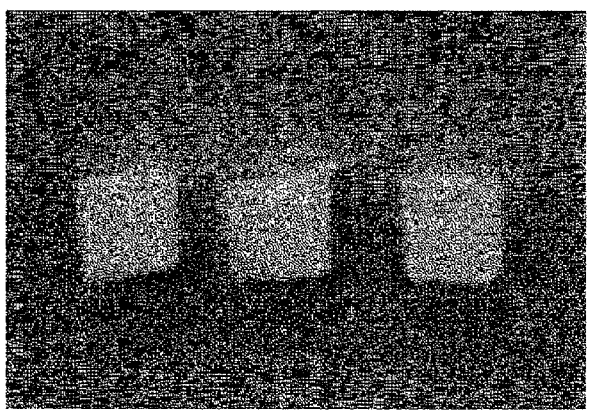
FIG. 5 is a photograph in which resin composition pellets from Comparative Example 2 are placed on a flat plate, with a side face facing downward, and the opposite side faces are photographed from above.

Furthermore, FIG. 2 shows a photograph of the ellipsoidal faces of the resin composition pellets in Example 4; FIG. 3 shows a photograph of the side faces of the resin composition pellets; FIG. 4 shows a photograph of the ellipsoidal faces of the resin composition pellets in Comparative Example 2; and FIG. 5 shows a photograph of the side faces of the resin composition pellets.

TABLE 3

|  | Composition | Degree of vacuum | Pellet shape | | |
|---|---|---|---|---|---|
|  |  |  | Long diameter a (mm) | Short diameter b (mm) | Length c (mm) |
| Example 4 | EVOH (29 mol %)/magnesium sulfate = 90/10 | −90 kPa | 3.07 | 2.30 | 3.0 |
| Example 5 | EVOH (29 mol %)/magnesium sulfate = 90/10 | −60 kPa | 3.01 | 2.22 | 3.0 |
| Example 6 | EVOH (29 mol %)/magnesium sulfate = 90/10 | −30 kPa | 3.04 | 2.02 | 3.0 |
| Comparative Example 2 | EVOH (29 mol %)/magnesium sulfate = 90/10 | OFF | 3.63 | 1.72 | 3.0 |

TABLE 4

|  | Short diameter/long diameter (Pellet ellipticity) | Long diameter/length | Repose angle (°) |
|---|---|---|---|
| Example 4 | 0.75 | 1.02 | 43 |
| Example 5 | 0.74 | 1.00 | 44 |
| Example 6 | 0.66 | 1.01 | 44 |
| Comparative Example 2 | 0.47 | 1.21 | 45 |

Based on a comparison between the Examples and Comparative Examples shown in Table 3 and Table 4, it is understood that, when manufacturing resin composition pellets containing EVOH and a desiccant, pellets having a large pellet ellipticity can be obtained by vacuum suctioning at the extruder vents.

Furthermore, comparing the photographs of the resin composition pellets in Example 4 and Comparative Example 2, it is also understood that the ellipsoidal face is flattened in Comparative Example 2 as compared with Example 4.

Note that, as is understood from Reference Examples 1 and 2, with ordinary EVOH pellets that do not contain a desiccant, there is no change in pellet ellipticity whether or not vacuum suctioning is performed, and therefore a person skilled in the art would likewise not ordinarily perform vacuum suctioning when manufacturing EVOH pellets containing a desiccant. Accordingly, it will also be noted that a person skilled in the art could not easily conceive of undertaking the extra work of vacuum suctioning for the purpose of increasing pellet ellipticity when manufacturing a resin composition pellet containing EVOH and a desiccant.

INDUSTRIAL APPLICABILITY

The resin composition pellet of the present invention is suitable for use in manufacturing various molded articles used for foods, pharmaceuticals, agrichemicals, industrial chemicals and the like.

EXPLANATION OF THE SYMBOLS a long diameter of ellipsoidal face S
b short diameter of ellipsoidal face S
c length of pellet P
S ellipsoidal face of pellet P
P pellet

The invention claimed is:

1. A resin composition pellet containing a thermoplastic resin and a desiccant and having an elliptic cylindrical shape,
wherein the ratio of the short diameter to the long diameter of the ellipsoidal face of the pellet (short diameter/long diameter) is from 0.5 to 0.9.

2. The resin composition pellet according to claim 1, wherein the content of the desiccant is 1 to 40 wt %, with respect to the thermoplastic resin.

3. The resin composition pellet according to claim 1, wherein the ratio of the long diameter of the ellipsoidal face of the pellet to the length of the pellet (long diameter/length) is 0.2 to 2.

4. The resin composition pellet according to claim 1, wherein the thermoplastic resin contains at least one member selected from the group consisting of a polyamide-based resin, a polyolefin-based resin, a polyester-based resin, a polystyrene-based resin, and a saponified ethylene-vinyl ester-based copolymer.

5. The resin composition pellet according to claim 1, wherein the thermoplastic resin contains a saponified ethylene-vinyl ester-based copolymer.

6. The resin composition pellet according to claim 2, wherein the ratio of the long diameter of the ellipsoidal face of the pellet to the length of the pellet (long diameter/length) is 0.2 to 2.

7. The resin composition pellet according to claim 2, wherein the thermoplastic resin contains at least one member selected from the group consisting of a polyamide-based resin, a polyolefin-based resin, a polyester-based resin, a polystyrene-based resin, and a saponified ethylene-vinyl ester-based copolymer.

8. The resin composition pellet according to claim 3, wherein the thermoplastic resin contains at least one member selected from the group consisting of a polyamide-based resin, a polyolefin-based resin, a polyester-based resin, a polystyrene-based resin, and a saponified ethylene-vinyl ester-based copolymer.

9. The resin composition pellet according to claim 6, wherein the thermoplastic resin contains at least one member selected from the group consisting of a polyamide-based resin, a polyolefin-based resin, a polyester-based resin, a polystyrene-based resin, and a saponified ethylene-vinyl ester-based copolymer.

10. The resin composition pellet according to claim 2, wherein the thermoplastic resin contains a saponified ethylene-vinyl ester-based copolymer.

11. The resin composition pellet according to claim 3, wherein the thermoplastic resin contains a saponified ethylene-vinyl ester-based copolymer.

12. The resin composition pellet according to claim 4, wherein the thermoplastic resin contains a saponified ethylene-vinyl ester-based copolymer.

13. The resin composition pellet according to claim 6, wherein the thermoplastic resin contains a saponified ethylene-vinyl ester-based copolymer.

14. The resin composition pellet according to claim 7, wherein the thermoplastic resin contains a saponified ethylene-vinyl ester-based copolymer.

15. The resin composition pellet according to claim 8, wherein the thermoplastic resin contains a saponified ethylene-vinyl ester-based copolymer.

16. The resin composition pellet according to claim 9, wherein the thermoplastic resin contains a saponified ethylene-vinyl ester-based copolymer.

* * * * *